United States Patent

Damghani

[11] Patent Number: 5,862,470
[45] Date of Patent: Jan. 19, 1999

[54] TIME SHARED MULTIPLE UNIT OPERATION IN A COMMUNICATION SYSTEM

[75] Inventor: Yamin Damghani, Dallas, Tex.

[73] Assignee: Uniden America Corporation, Fort Worth, Tex.

[21] Appl. No.: 548,277

[22] Filed: Oct. 25, 1995

[51] Int. Cl.$^6$ ........................................ H04B 7/26
[52] U.S. Cl. ........................ 455/418; 455/422; 455/565; 455/181.1
[58] Field of Search .................... 455/33.1, 34.1, 455/34.2, 53.1, 54.1, 54.2, 56.1, 62, 67.1, 89, 181.1, 186.1, 200.1, 405, 410, 411, 418, 419, 420, 42, 423, 424, 462, 463, 507, 517; 379/192, 196, 197, 198, 199, 200

[56] References Cited

U.S. PATENT DOCUMENTS 5,212,810  5/1993  Maeda et al. ............................ 455/89
5,467,388  11/1995  Redd, Jr. et al. ....................... 379/196

*Primary Examiner*—Thanh Cong Le
*Attorney, Agent, or Firm*—Sidley & Austin

[57] ABSTRACT

Telecommunication equipment, such as mobile radios, cellular telephones, pager systems and central controllers, etc., can be programmed to be operational during certain periods of time. A predefined period of usage, such as daylight hours (6:00 a.m.–6:00 p.m.) can be programmed into the telecommunication equipment. When a request for service is made, the actual time thereof is compared to the programmed window of operation. If the requested time of operation is within the window, telecommunication services are established. On the other hand, if the requested time of operation falls outside the window, telecommunication services are denied.

23 Claims, 6 Drawing Sheets

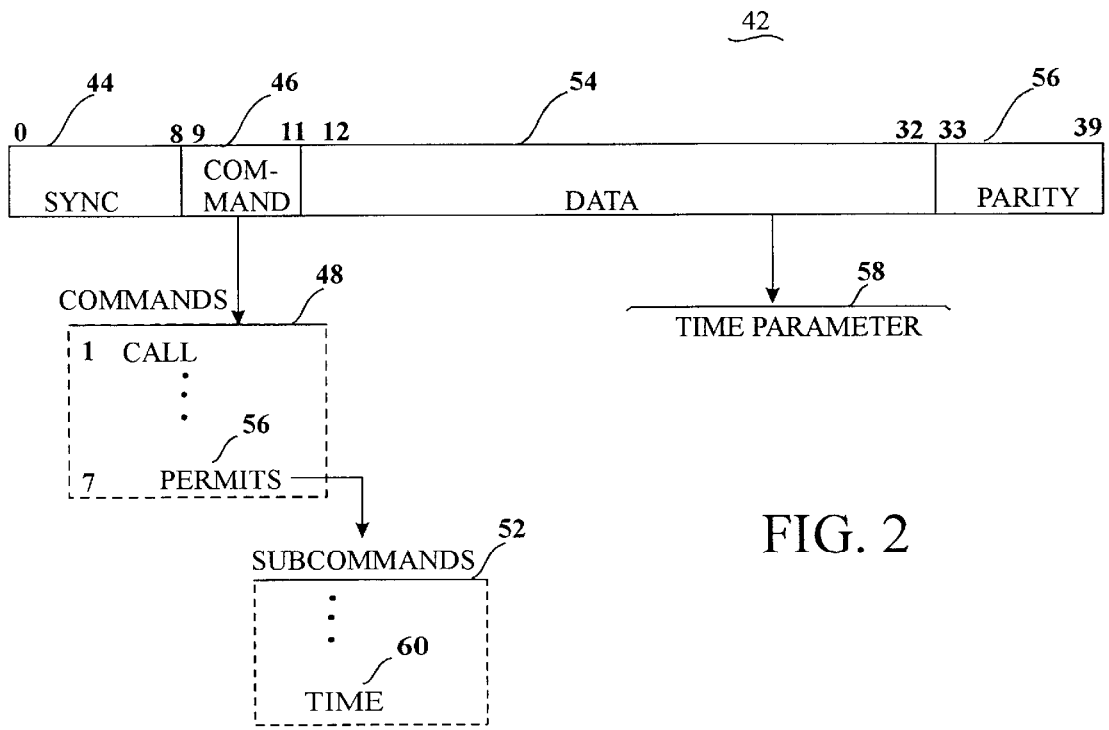
FIG. 2
FIG. 3
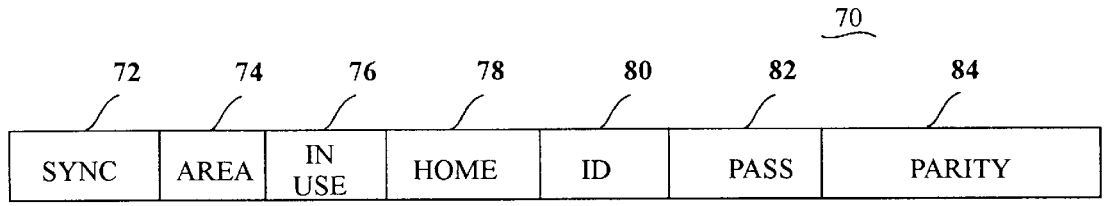

TIME SHARED MULTIPLE UNIT OPERATION IN A COMMUNICATION SYSTEM

TECHNICAL FIELD OF THE INVENTION

The present invention relates in general to telecommunication apparatus and techniques for controlling communications, and more particularly to apparatus and techniques for increasing the capacity of telecommunication systems.

BACKGROUND OF THE INVENTION

It is well known that the efficiency of electrical and mechanical apparatus can be optimized by operating such equipment at or near full capacity. It is therefore the general endeavor to utilize or improve many systems to operate at full capacity and therefore achieve maximum efficiency. Telecommunication systems of all types are no exception, in that efforts are continually being advanced to first, operate systems at or near full capacity, and then to expand the capacity to encompass additional service, features, etc. and thereby realize additional economic benefits.

As an example of the foregoing, electronic switching systems have replaced the mechanical type systems to increase speed of operation and accommodate more telephone calls. Time division and space multiplexing of telephone calls have been implemented to increase the usage of facilities, thereby improving operation. In the cellular telephone field, digital processing and "roaming" have been fully implemented to improve the efficiency and generate traditional customer services. In the mobile radio field, many of the foregoing features have been implemented, as well as trunking to increase the usage of the various radio channels. Many other examples exist that are illustrative of the new and different types of techniques and equipment that can be employed to expand services and optimize the efficiency of communication equipment.

As can be seen from the foregoing examples, the enhancements to expanded capacity generally involve additional equipment which, in many instances, may be difficult to integrate into existing systems, and which may involve substantial cost or down time for implementing the enhancement. On the other hand, very little advancement has been undertaken in the telecommunication industry toward the fuller utilization of existing equipment by allocating different time intervals for users. In other words, the capacity of existing systems can be more fully utilized by allowing certain customers the use of the services and equipment during certain times, and denying the use thereof during other times to allow other customers the utilization of the same equipment and services.

A need therefore exists for expanding the capacity of communication equipment while yet minimizing capital expenditures of additional equipment. A further need exists for a system that can coordinate the use of the equipment and services to certain customers during certain time periods, and deny services at other times so that during such time the communication equipment and services are allocated to other customers.

SUMMARY OF THE INVENTION

In accordance with the principles and concepts of the present invention, there is disclosed a technique for controlling the time periods in which customers are entitled to utilize the services of the communication equipment. In a preferred form of the invention, a subscriber instrument, which may be a residential or office telephone set, a cellular telephone, a mobile radio, a paging unit, radio data system or other type of communication hand set, is assigned a period of use based on time and controlled as to such use by either the subscriber instrument itself or a central controller.

In the preferred form, the invention is embodied in a mobile radio communicating with a base station. In a rudimentary form, for example, one mobile radio operating in conjunction with the base station is allocated a specified period of usage, such as 6:00 a.m. to 6:00 p.m., i.e., during general daytime business hours. On the other hand, another mobile radio operating on the same frequency and with the same base station is allocated the period of usage from 6:00 p.m. to 6:00 a.m., i.e., during general non-business hours.

Mobile radio base stations, in general, are presently equipped to provide real time indications for various purposes. Preferably, the indications of time are transmitted during certain frame intervals by the base station to each of the mobile radios so as to efficiently make available a time parameter to each mobile radio. Time control of the system can be programmed either into the mobile radio itself, into the base station controller, or both. When programmed into the mobile radio, the original software is modified slightly to include therein the window of usage for the specific mobile radio, and a short algorithm to compare the time parameter transmitted from the base station to determine if it is within the authorized window. If so, the mobile radio is allowed to operate, otherwise the mobile radio operation is denied. In this manner, with minor software modifications to the mobile radio, the time of operation thereof is limited to the window of time programmed therein.

When the time control is programmed into the base station, a window of time is correlated to the unique identification code of the mobile radio. When a mobile radio transmission indicates that the particular mobile radio desires a communication channel, the base station will compare the time parameter with the authorized window of operation associated with the identification code of the mobile radio to determine if usage is allowed. If usage of the specific mobile radio is not allowed, a channel will not be allocated and the mobile radio will be denied access to the base station. The usage of the communication equipment is thereby maximized without a requirement of substantial additional capital investment.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts throughout the views, and in which:

FIG. 2 is a diagram illustrating the transmission format of a mobile radio repeater, indicating a time parameter field inserted therein;

FIG. 3 is a diagram illustrating the transmission format of a mobile radio transmitter, indicating a unique identification code field in the transmitted frame of information;

DETAILED DESCRIPTION OF THE INVENTION

The description herein of the invention is directed to a preferred embodiment in the environment of mobile radio equipment. As is well known in the telecommunication field, mobile radio equipment may include either the hand-held user instruments themselves or the vehicle mounted instruments for providing two-way communications, one or more repeaters which may or may not include data processing capabilities (the repeater systems which are often called "base stations"), accompanying receive/transmit equipment and any auxiliary equipment for interfacing with the public telephone system, satellite, land lines, etc. However, it is to be understood that the invention may be equally advantageous for use in the cellular telephone field that also employs hand-held receive/transmit instruments and fixed central controllers, as well as the conventional public telephone communication network equipment employing business and residential subscriber instruments interconnected in a national network of central offices, toll switching equipment, microwave, satellites, pagers, etc. Indeed, the invention may be highly advantageous with yet other communication equipment other than that generally described above. As will be appreciated from the following description of the principles and concepts of the invention, many areas and fields involving the communication of information can achieve an increased efficiency of equipment as well as the realization of further economic benefits by the utilization of the sharing of the same equipment or facilities by different users at different time periods.

Figure 1:
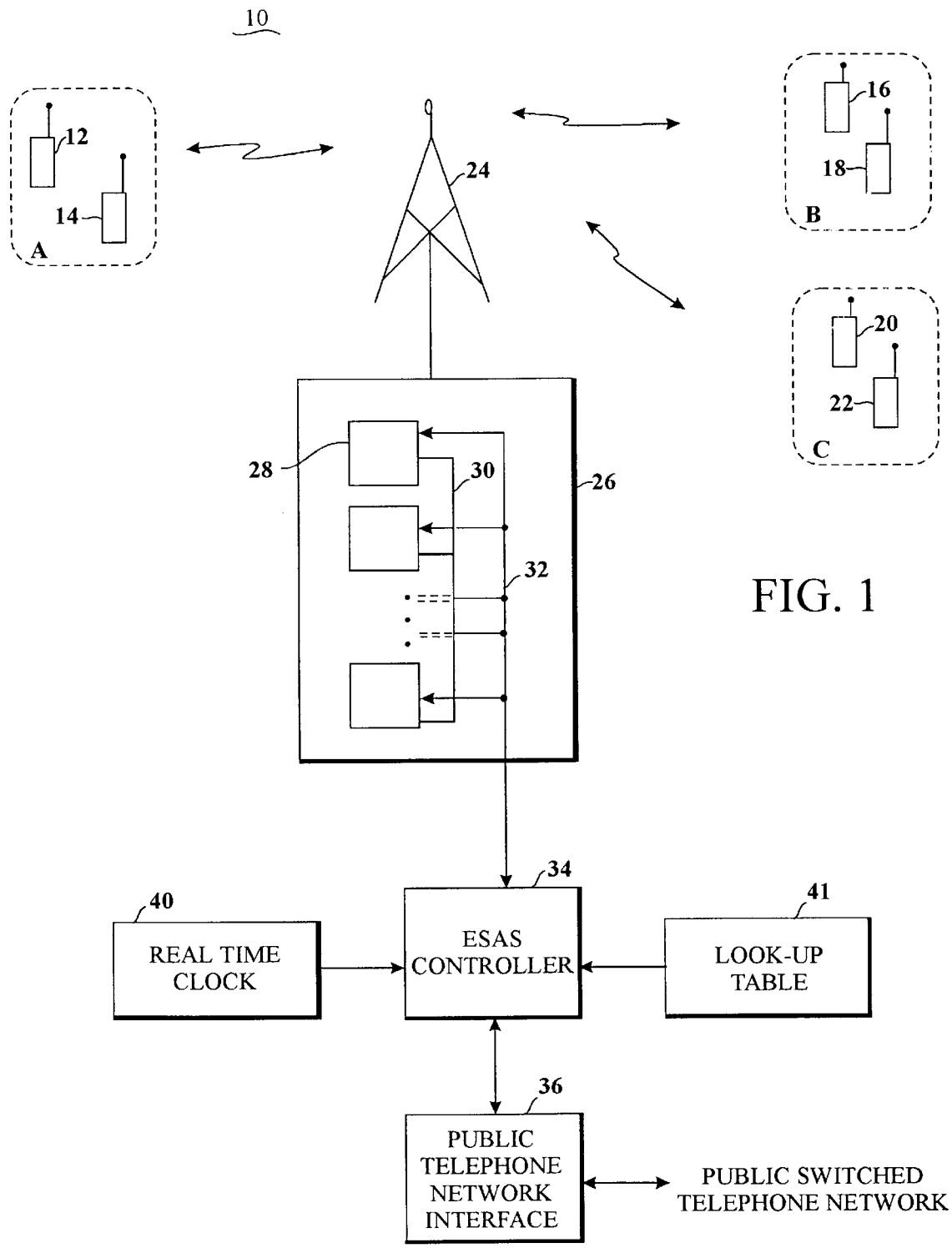
FIG. 1 is a generalized drawing depicting a mobile radio system.

With reference now to FIG. 1, there is illustrated in block diagram form the rudimentary equipment of a mobile radio communication system 10 well known by those skilled in the art. One mobile radio or transceiver is identified by reference numeral 12, which may be either of the hand-held or the type installed in a vehicle. Additional mobile radios, such as shown by reference numeral 14, may be associated as a group, i.e., group A. The mobile radios 12 and 14 are capable of communicating with each other, as well as with other groups such as mobile radios 16 and 18 of group B, or mobile radios 20 and 22 of group C. Of course, the groups may include many more than two mobile radios, but can also consist of a single mobile radio.

In order to provide repeater and trunking capabilities, the communication system 10 may include one or more transmit/receive antennas 24, all associated with a base station 26. Typically, a base station 26 includes a plurality of repeaters, one shown by reference numeral 28. Further, each repeater 28 may be interconnected together with electrical buses 30 to provide communications therebetween. An additional bus 32 is connected, in the preferred embodiment, to a central controller 34 or switch. The controller can be of many different types, and in the preferred embodiment is an Extended Sub-Audible Signaling (ESAS®) controller. Such type of controller is conventionally available from Uniden America Corporation, Fort Worth, Tex. With such type of controller 34, each mobile radio 12 is uniquely identified with a unique identification code (UID). As noted in FIG. 1, the ESAS controller 34 is adapted for connection to the public telephone network by way of interface 36. With this arrangement, the mobile radio 12 can communicate with other mobile radios, as well as to cellular telephone instruments or business/residential telephones by way of the public telephone network interface 36. As noted above, while the preferred embodiment of the principles and concepts of the invention are applicable to a mobile radio communication system, the invention is also equally applicable to cellular radio systems, business/residential telephone systems as well a many other types of communication systems.

In addition to the foregoing, the communication system 10 is equipped with a real time clock 40 for providing indications of the time of day. In the ESAS controller 34, the real time clock 40 comprises an electrical clock circuit for generating indications of the time of day, by calendar date, hour, minute and seconds. Those skilled in the art may find it advantageous to utilize other types of real time clocks, such as software and other electrical, mechanical or scientific type of clock standards. Nevertheless, the real time clock 40 functions as a time base for coordinating the operation of the mobile radio transceiver 12.

Associated with the ESAS controller 34 is a look-up table 41 for correlating each mobile radio unique identification code (UID) with an allowed window of operation. Accordingly, when a mobile radio 12 attempts to initiate or receive communications, the UID field is decoded by the ESAS controller 34 from the frame of transmitted information, and correlated with the predefined window of operation stored in the look-up table 41 to determine if communications are allowed.

Mobile radios are well known in the communication field, and according to present day standards, such radios are processor controlled with at least one programmed microprocessor. The operation of the mobile radio 12, as well as the other transceivers shown in FIG. 1, is controlled by a program permanently stored in non-volatile memory associated with the microprocessor. In order to be adapted to accommodate the invention, the mobile radio 12 need only be reprogrammed or modified to process time of day data. While each mobile radio 12 could be additionally equipped with a real time clock, such a retrofit would involve additional circuitry and expense to each mobile radio 12. Thus, it is more preferable to include additional programming instructions in the ESAS controller 34 to encode and transmit a time of day parameter to each mobile radio 12. In this manner, each mobile radio has available indications of real time to thereby allow operations within predefined windows of time.

FIG. 2 illustrates a frame 42 of information transmitted by the base station 26 of FIG. 1, as controlled by the ESAS switch 34. The format of data bits of the frame 42 includes a total of 40 bits receivable by every mobile radio tuned to the channel frequency at which the particular repeater 28 is transmitting. It is to be understood that many other formats may be employed in the transmission and reception of information in a communication link to establish either a data or talking path. A 9-bit synchronization field 44 is transmitted by the repeater 28 and detected by the mobile radio 12 to indicate the presence of and the beginning of a data message. A 3-bit command field 46 allows eight different types of primary commands to be received by the mobile radio 12. One of the primary commands of field 46 is an indication of a full duplex mode of communication. With such type of communication, two mobile radio communication channels are required. The different types of primary commands 48 include a call command, and other commands, including a permits command 50. Moreover, the permits command 50 may be extended to a number of subcommands 52 in subsequently transmitted frames. In other words, when a 3-bit permits command 50 is transmitted in a first frame 42, the 3-bits of data in the command field 46 of the subsequently transmitted frame will be a subcommand which is different from but associated with a primary command 48. A number of frames may be required to be transmitted to complete the full number of bits to define sufficient information for the mobile radio 12 to decode a time or other subcommand. When a subcommand is decoded as "time," this indicates that the data in another field in the frame 42 comprises a time parameter.

A 21-bit data field 54 in the frame 42 allows for the transmission of bits to define information such as a call destination, a time parameter 58, etc. Lastly, a 7-bit parity field 56 is transmitted so that when received, the integrity of the entire frame 42 can be checked for transmission errors.

In transmitting a time parameter 58 in data field 54, the ESAS controller 34 transmits the requisite sync field 44, the parity field 56 and a permits command 50 in the command field 46. In the data field there is transmitted twenty-one bits of other information. When the permits command 50 is received by the mobile radio 12, it is known that a subsequent frame will be transmitted. When the command field 46 of the subsequent frame is decoded, it will identify the corresponding data field 58 thereof to be related to a subcommand 52, and specifically the subcommand of time 60. When the subcommand of time 60 is received, the corresponding 21-bits of field 54 in that frame is considered as a time parameter 58. As noted above, the time parameter 58 in the preferred embodiment corresponds to a time of day. The "time of day" may also include day, month and year information. With this arrangement, the mobile radio 12 can process real time information without requiring real time clock circuitry. In addition, the mobile radio 12 can increment an initially received time parameter 58 by software techniques so as to maintain an accurate time of day for a sufficient period of time. Thus, once a mobile radio 12 checks into the repeater base station 26 the first time in a 24-hour period, the time parameter 58 will be received and thereafter incremented by the software of the mobile radio 12 to maintain an accurate account of time for the remainder of the day. Alternatively, the base station 26 can continuously transmit to each mobile radio a current time of day parameter.

FIG. 3 illustrates a frame 70 of data transmitted by the mobile radio 12 and thus received by the repeater base station 26. A synchronization field 72 corresponds to the similar field 44 described above in connection with the repeater transmit frame 42. A 1-bit "area" field 74 is employed for distinguishing two different systems operating on the same channel frequency. A 5-bit "in use" field 76 indicates which repeater is being utilized for transmitting on the channel frequency. A 5-bit "home" field 78 identifies the home repeater of the mobile radios for which a particular call is intended. An 8-bit "ID" field 80 contains the unique identification code of the mobile radio 12 itself. A 5-bit "pass" field 82 is used for a different protocol purpose. Lastly, a 7-bit "parity" field 84 is checked when the frame 70 is received by the repeater base station 26 to verify the integrity of the transmitted data.

Figure 4:
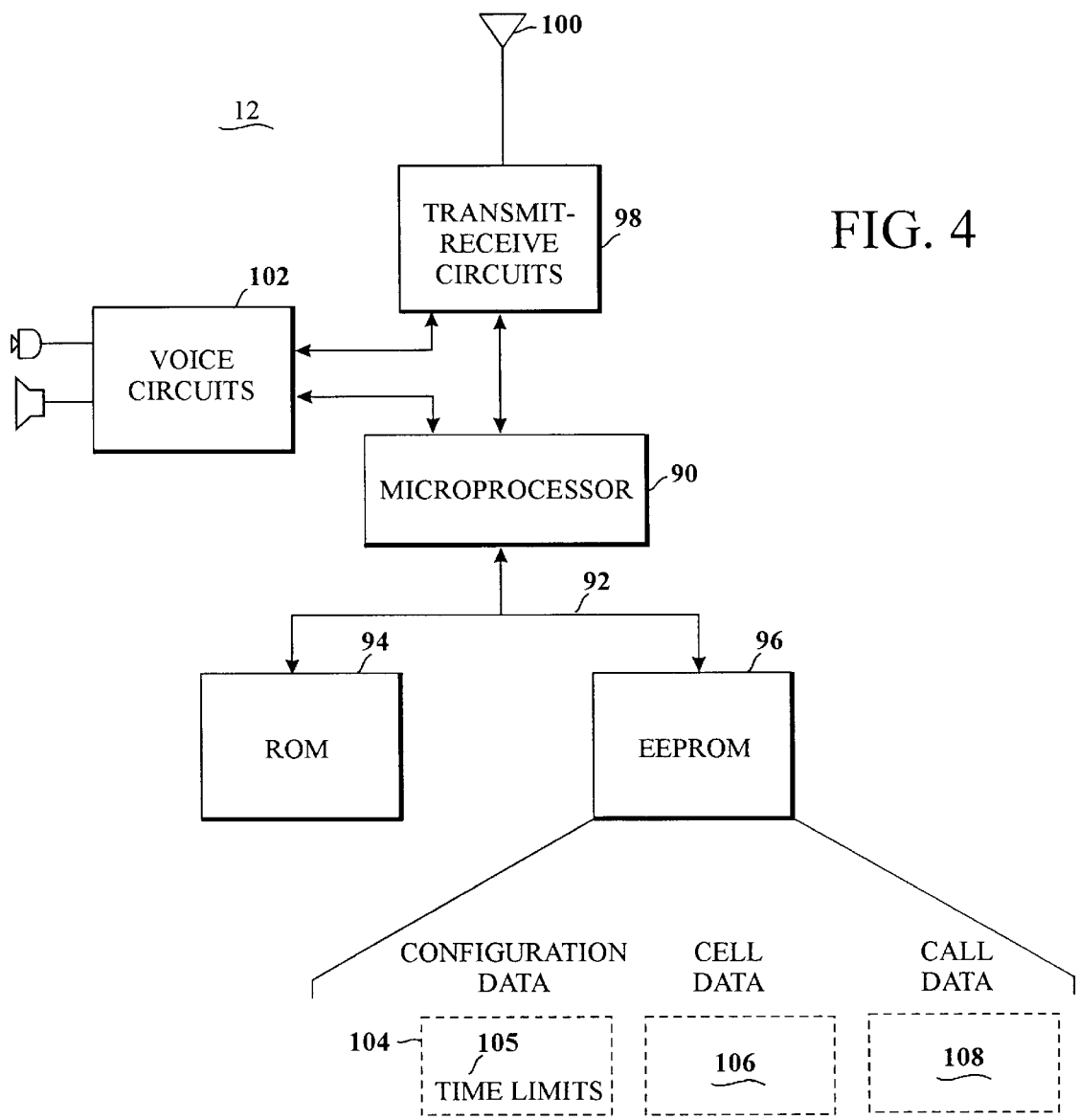
FIG. 4 is a generalized block diagram of a mobile radio transceiver and the memory allocation thereof.

FIG. 4 illustrates a block diagram of a basic mobile radio 12 according to the invention. The microprocessor 90 is coupled to ROM 94 and EEPROM 96 by way of a bus 92. The microprocessor 90 also controls a transmit/receive circuit 98. The transmit/receive circuit 98 is coupled to an antenna 100 for transmitting and receiving data messages as well as modulated voice information. A voice circuit 102 is controlled by the microprocessor 90 to provide speaker outputs and microphone inputs to the transmit/receive circuit 98. The EEPROM 96 comprises non-volatile memory segmented into various areas, such as shown in the expanded portion of FIG. 4. The partitioned memory area includes a radio configuration area 104, a cell data area 106 and a call data area 108.

The memory 96 of the mobile radio 12 includes the radio configuration area 104 for storing data defining the various parameters in which the mobile radio 12 can operate. Various types of data, such as the following, is stored in the radio configuration area 104 of the mobile radio 12:

a) unique mobile radio identification code (UID), b) home system identification, c) the various features of the mobile radio, d) information concerning systems and the respective frequencies, e) prestored destination information, and f) time limits of operation of the mobile radio.

The time limit data 105 stored in the configuration memory area 104 defines the limits of the authorized window of operation. The window of operation includes a start time, such as 6:00:00 a.m., and a stop time, such as 5:59:59 p.m. If the mobile radio 12 is authorized to operate for the full 24-hour period each day, then the start time can be programmed as 12:00:00 a.m. to 11:59:59 p.m. Alternatively, the time limit data 105 can include predefined unique codes to identify 24-hour operation, half or quarter day operation, week-end only operation, holiday only operation, etc. Depending on the need, a different time of operation can be associated with each day, week or month so that the window can vary.

While not relevant to the present invention, the memory of the mobile radio 12 also includes the other dedicated areas noted above, i.e., a cell data memory area 106 and a call data memory area 108.

Figure 5:
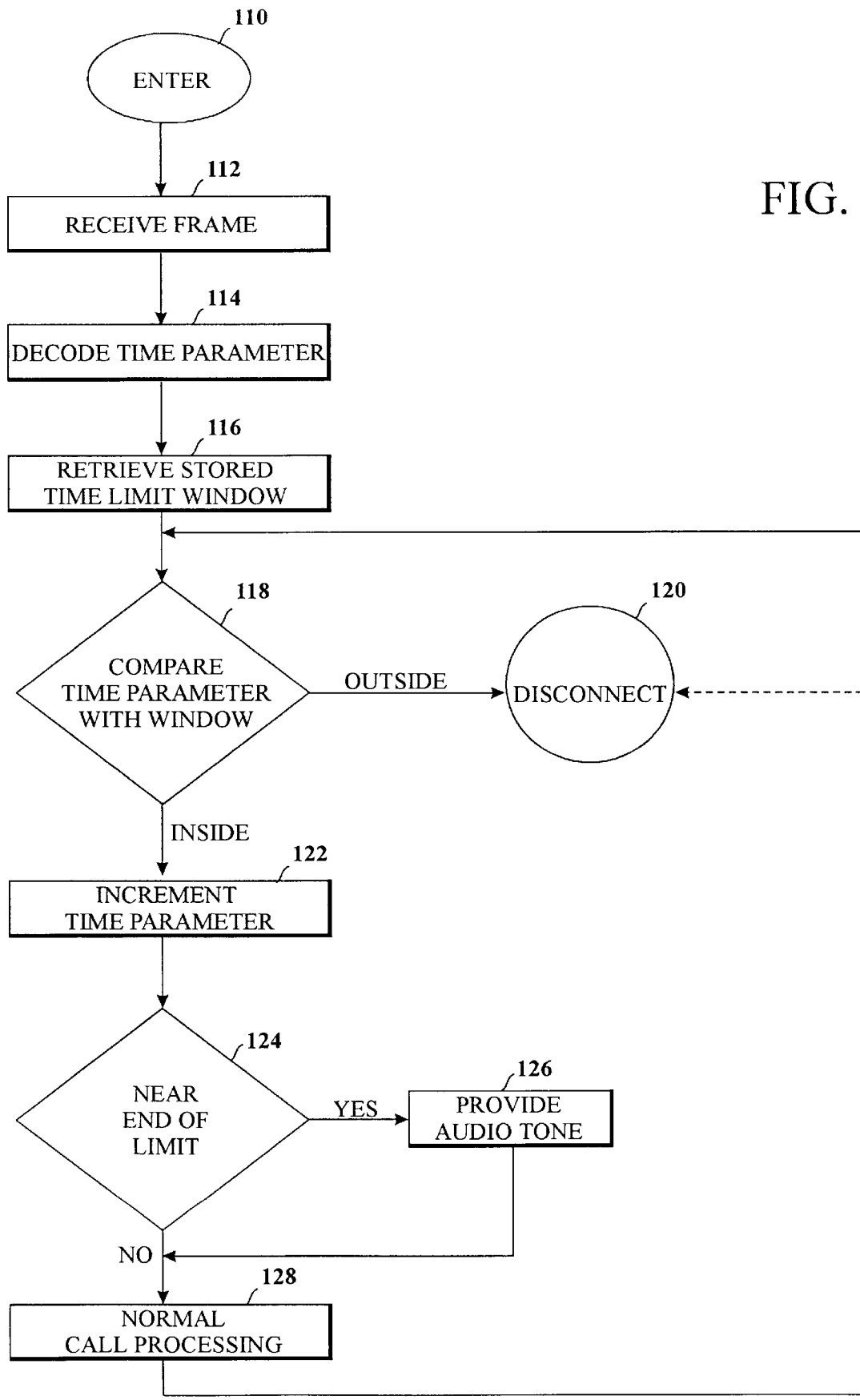
FIG. 5 is a software flow chart depicting the operations programmed into a mobile radio transceiver to time limit the operation thereof.

FIG. 5 illustrates the processing of software instructions by the microprocessor 90 of the mobile radio 12 shown in FIG. 4. The flow chart of instructions shown in FIG. 5 can be easily embedded in the call processing software routinely programmed into a mobile radio. In the alternative, the additional processing instructions can be implemented as a subroutine, or by other standard programming techniques well known by those skilled in the art. The microprocessor 90 enters the software or routine as shown by block 110. Thereafter, the base station transmission frame 42 (FIG. 2) is received by the mobile radio 12, as shown in program flow block 112. The frame 42 of data is decoded as to all of its fields, as shown in program flow block 114. Particularly, the permits command 50 is decoded in a first frame, and thereafter the permits subcommand of time 60 is decoded, whereupon the corresponding time parameter data field 58 is decoded to provide the mobile radio 12 with the current time of day. In the preferred embodiment, the time of day is contemplated to be transmitted as data defining the day, hour, minute, and second. Once the time parameter 58 is decoded, the microprocessor 90 retrieves from the memory configuration area 104 the time limit or window of operation 105 assigned to the mobile radio 12. In other words, each mobile radio can be preprogrammed to operate only during specific time periods of the day, week, month, etc. For example, a certain mobile radio 12 assigned to a person can be preprogrammed to operate on a predefined channel during the time period of 6:00 a.m. to 6:00 p.m., i.e., daytime. If an attempt is made to operate outside of this window, communication by the mobile radio 12 is denied. On the other hand, another mobile radio 16 operating on the same channel frequency can be preprogrammed to operate from 6:00 p.m. to 6:00 a.m., i.e., at night time. The operation of the first mobile radio 12 during only the day time can be assigned to, for example, a florist delivery service. In contrast, the night time operation of another mobile radio 16 on the same channel can be assigned to a night cleaning crew. With this arrangement, a higher degree of resource utilization can be employed by sharing the same radio communication channel at different time periods. Indeed, the same radio channel can be shared in a 24-hour period of time by more than two mobile radios. It is also contemplated that the same channel frequency can be time shared between two businesses, such as during week days and weekend days.

With reference again to FIG. 5, the preprogrammed window 105 is retrieved from the configuration database area 104, as shown by program flow block 116. In decision block 118, the microprocessor 90 compares the time parameter 58 received in the transmission frame 42 with the window 105 preprogrammed in the mobile radio 12. In practice, the time limit window 105 can include a start time and a stop time defining the end limits of the window. If the time parameter 58 is found during the processing according to decision block 118 to be outside of the window 105, then processing proceeds to block 120 where the initiation of communications is discontinued. Stated another way, if the mobile radio 12 is attempted to be utilized outside of its window of authorized use, service will be denied by failure to establish communications with the base station 26, i.e., by a disconnect.

In the event the current time parameter 58 is within the widow 105, processing continues from decision block 118 to block 122 where the time parameter is incremented. The increment in the time parameter is by the same amount it routinely takes the processor to repeatedly traverse the processing loop. The increment to the time enables the current time to be maintained. This time period increment can vary between different types of mobile radios. Depending upon the particular algorithm and type of time data stored, it may be more advantageous to utilize a decrement software counter, rather than an increment software counter noted in FIG. 5.

After the time counter is advanced, processing proceeds to decision block 124 where it is determined if the operation of the mobile radio 12 is near the end of the window period. For example, if the mobile radio 12 only has one minute remaining until the end of its window period, a distinctive audio tone can be provided to the mobile radio user, as shown in block 126. While many distinctive tones may be utilized to denote the nearing of the stop limit of the window, a subdued "beep" can be repeatedly sounded, with the spacing between the beeps being shorter as the window nears its end. Also, a visual indication may be provided, such as a blinking lamp or light emitting diode. Thereafter, processing continues as it would otherwise, to the program block designated as reference numeral 128, which signifies the call processing undertaken by the mobile radio 12 in its normal operation. At the end of call processing, such as when the user releases the transmit button of the mobile radio, the microprocessor 90 proceeds to the disconnect routine 120. If, on the other hand, normal call processing proceeds, the time limit comparison routine is again entered at decision block 118. Here, the window is again compared with the incremented time period to determine if the operation is yet within the window period 105. Depending upon the outcome of the decision of block 118, call processing continues as described above.

Figure 6:
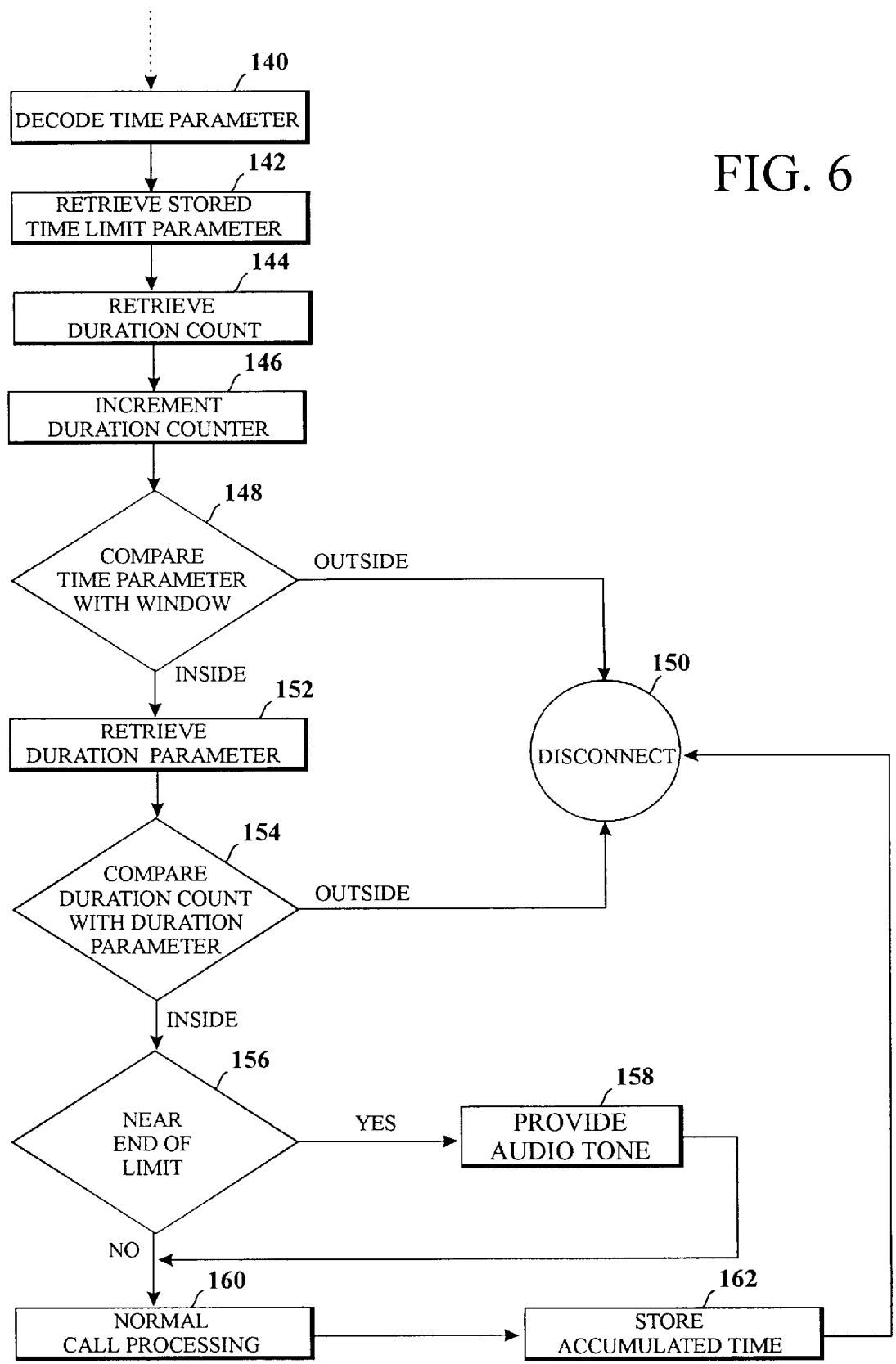
FIG. 6 is a software flow chart depicting the operations programmed into a mobile radio transceiver as set forth in FIG. 5, but additionally providing an overall limitation on the total duration of usage thereof.

FIG. 6 illustrates the programming of a mobile radio 12 in which a duration parameter is additionally employed. A duration parameter can be preprogrammed in the configuration data area 104 of the non-volatile memory 96. Essentially, the duration parameter can be used either by itself or in conjunction with the time limit window parameter 105 described in connection with FIG. 5. Essentially, the duration parameter denotes an accumulated time period or duration to which the operation of the mobile radio is limited. The duration can be limited to a predefined number of minutes or hours per day, or within the time limit window 105. When employing this feature, the time parameter 58 is decoded from the frame 42, and the time limit window 105 is retrieved from the memory 104, as noted in program flow blocks 140 and 142. In program flow block 144, the microprocessor 90 retrieves the count of the duration counter previously stored in the EEPROM memory 96. It is noted that the duration counter is reset at the beginning of each major time period, such as each day, or at the beginning of each different time limit window period. Next, the duration counter is incremented, as noted in program flow block 146. A comparison is made between the time parameter and the window to determine if the present communication is occurring within the allotted window of operation. If it is outside of the window, a disconnect or service refusal is established, as noted in program flow block 150. If the time parameter is within the window, processing proceeds to block 152 where the predefined duration parameter is retrieved from the configuration data area 104. The duration parameter is a prescribed time period which cannot be exceeded for an accumulation of calls during the window of operation. For example, certain mobile radios can be preprogrammed to use the channel for only, as an example, one hour of accumulated time during the window of operation. With this arrangement, 60 one-minute calls can be made before exceeding the duration parameter. Many other types of time parameters can be employed, in addition to that described herein.

In program flow block 154, a comparison is made to determine if the accumulated duration of the calls exceeds the duration parameter. If the accumulated time of the calls within the window period exceeds the duration parameter, processing proceeds to block 150 where mobile radio operation is discontinued. Otherwise, processing continues to decision block 156 where a determination is made if the mobile radio is operating near the end of the window period or near the end of the duration period. If decision block 156 results in the affirmative, then a distinctive audio tone is provided, as shown in program flow block 158. Otherwise, normal call processing proceeds as shown by the program flow block 160. After call processing terminates, for whatever reason, the accumulated time is stored in the EEPROM memory 96, as noted by program flow block 162. Thereafter, mobile radio operation is discontinued or disconnected as noted in block 150. Those skilled in the art may readily appreciate that the duration parameter can be employed without the use of the time limit window.

As a further refinement of the foregoing, other parameters can be utilized to further limit mobile radio communications in a variety of situations. For example, in either of the program flow diagrams of FIGS. 5 or 6, mobile radio communications can be further limited as to the various systems with which such radios can operate. For instance, if a communication is attempted by the user of a mobile radio 12 with one type of system, then the time limit window need not be invoked at all. In contrast, when the mobile radio 12 attempts to communicate with certain other types of systems, the time limit window can be invoked. This limitation can additionally be employed by interposing within the call processing routine a check to determine what type of system is attempted to be called. Again, system identification numbers and their association with a time limit window can be programmed into the cell data area 106 of the EEPROM memory 96. In other words, each time the mobile radio 12 attempts to communicate with a system, the system ID is cross-referenced in the cell data memory area 106 to determine if such system is associated with a time limit window. If not, then call processing continues without invoking any time limit whatsoever when communicating with such system. Otherwise, if a time limit window is associated with a system, then the program flow of FIG. 5 is invoked.

Another limit on the use of the mobile radio 12 can be associated with the type of call being made. For example, a mobile radio involved in a full duplex communication can be prevented from operating during high traffic periods of time. It is appreciated that a full duplex operation of mobile radios utilizes two repeaters and two corresponding communication channels. Thus, the full duplex operation of a mobile radio communication requires twice the resource facilities as does a half duplex transmission. In practice, when a communication is of a full duplex type requiring two mobile radio channels, such type of operation is transmitted by the ESAS controller 34 to the mobile radio 12 in the 3-bit command field 46 of the transmission format 42 shown in FIG. 2. Whether or not a mobile radio is capable of handling full duplex communications can also be programmed directly in the mobile radio 12. Accordingly, the mobile radio 12 can be programmed to ascertain when a full duplex operation is employed, together with the time parameter received from the base station 26 in conjunction with a time limit window which is known to be a high traffic time period. It is also noted that any different number of combinations of features described above can be programmed together to achieve a desired result.

Figure 7:
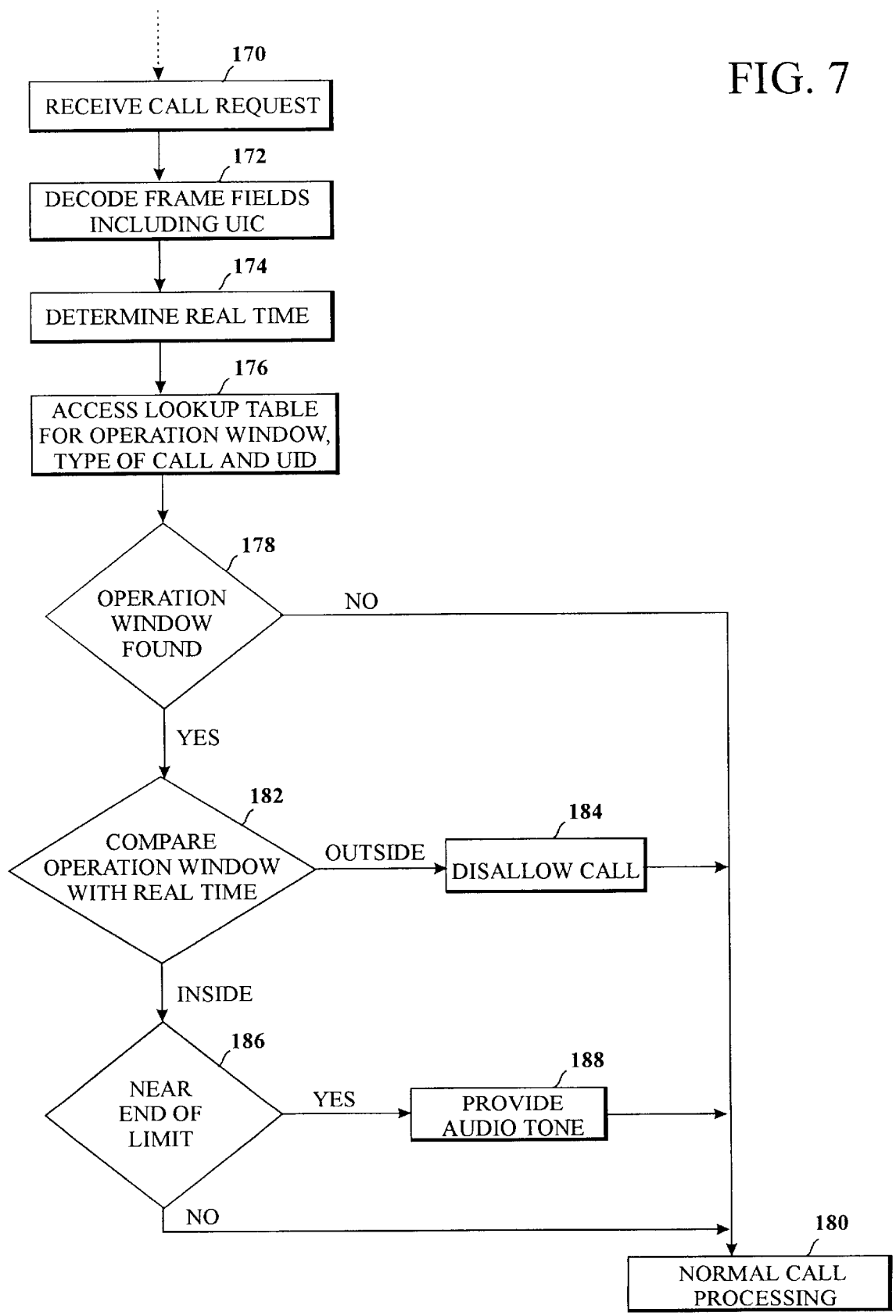
FIG. 7 is a flow chart illustrating the software operations programmed into a mobile radio base station to time limit the operation of various mobile radio transceivers associated therewith.

With reference now to FIG. 7, there is depicted the programmed changes in a base station 26, and particularly the ESAS controller 34 to achieve a time limit control over the operation of the mobile radios in communication therewith. During the normal course of processing a call in the base station 26, the ESAS controller 34 receives the call request from a particular mobile radio 12. This is illustrated in program flow block 170. The call request received from a mobile radio 12 includes at least one frame 70 formatted with fields shown in FIG. 3. Within the field 80, a unique identification code (UID) is decoded, as shown in program flow block 172 of FIG. 7. The program flow blocks 170 and 172 may occur early on in the call processing procedure, a portion of which is shown in FIG. 7. After the unique identification code 80 for the call request is decoded, the real time, or time parameter, is determined, as noted in block 174. The call processor then accesses a look-up table 41 programmed in the ESAS controller 34 to determine if there exists an operations window for that particular UID. The look-up table 41 can comprise an index of unique identification codes for the mobile radios, correlated either with the existence or non-existence of an operating window. Further, the correlation with an operations window will also include the time limits 105 of the window. The same type of look-up table 41 can be utilized in connection with group ID codes, as well as other unique numbers that identify particular situations in a mobile radio environment.

In program flow decision block 178, the controller 34 determines if there is an operating window found in the look-up table 41 in connection with the UID. If not, the processing branches to program flow block 180, where normal call processing continues. If, on the other hand, an operations window is correlated to the incoming unique identification code, then processing proceeds to block 182 where the operations window is compared with the real time determined in program flow block 174. If the call request is outside of the window of operation, the call is disallowed, as noted in program flow block 184, whereupon normal call processing then continues as to other call requests. If the real time is found to be within the operations window, program flow block 186 is encountered, where it is further determined if the current real time is near the end of the window of operation. If not, processing continues with program flow block 180 where the call request is processed toward completion. If, on the other hand, the call request is near the end of the window of operation, then program flow branches from decision block 186 to block 188, where a distinctive audio tone is provided to the mobile radio initiating the call request. This allows the user of the mobile radio to become aware that the window of operation is near the end of the time period. Again, from program flow block 188, processing continues with the call request.

Assuming the call request is initiated during the window of operation, and then subsequently continues until outside the window of operation, call processing branches from block 182 to thereafter discontinue or disallow the call, as noted in block 184.

Those skilled in the art may find that the various processing blocks noted in the foregoing flow charts may be arranged differently from that shown, and may be dispersed within either the main program or subroutines. Those skilled in the art may also find that the call processing of FIG. 7 can further be enhanced with the call duration limit, as described in conjunction with FIG. 6. Of course, additional functions can be added to the flow charts, such as allowing communications to be established after the window of operation, such as in the case of emergencies or the receipt of special digits like 911.

In summary, the disclosed apparatus and techniques provide an increase in the capacity of a communication system without substantial hardware or software costs. Indeed, many more users and existing mobile equipment can be employed without a substantial increase in the communication system itself.

Shown and described above are the fundamental novel features of the invention as applied to the preferred embodiment. It will be understood that various omissions, substitutions and changes in form and detail of the invention as described herein may be made by those skilled in the art without departing from the true spirit and scope of the invention as defined by the appended claims. Therefore, it is the intention that the invention be limited only by the scope of the following claims.

What is claimed is:

1. In a telecommunication equipment, a usage circuit for controlling use of a subscriber instrument, comprising in combination:

a subscriber instrument;

a timer for keeping time;

a preprogrammed time interval defining a window of usage of the telecommunication equipment;

a comparator for comparing the time of the timer with the window to provide at least two different outputs;

said subscriber instrument having a processor programmed to function as said timer and as said comparator; and a control circuit for denying completion of all calls from the subscriber instrument to the telecommunication equipment if the comparator output is of a first type, and allowing completion of the calls to the telecommunication equipment if the comparator output is of a second type.

2. The usage circuit of claim 1, wherein said telecommunication equipment includes a transmitter for dispatching telecommunication information to said subscriber equipment.

3. The usage circuit of claim 1, wherein said timer is adapted to count time increments by at least an hour.

4. The usage circuit of claim 1, wherein said subscriber instrument includes a nonvolatile memory having a window of operation programmed therein.

5. The usage circuit of claim 1, wherein said telecommunication equipment includes in combination a pair of mobile radios operating with an identical identification code, and each mobile radio has a memory programmed to allow operation of the two mobile radios at two mutually exclusive time periods.

6. A method of limiting usage of telecommunication subscriber equipment based on time, comprising the steps of:

programming a central control to define a window of time in which the telecommunication subscriber equipment can be utilized;

receiving a time parameter by said telecommunication subscriber equipment over a telephone communication facility from said central control;

comparing an actual time of attempted use of the telecommunication subscriber equipment with said window of time to determine whether utilization of the telecommunication subscriber equipment is allowed at the actual time; and if the comparison of the actual time with the window of time indicates no match therebetween, preventing all outgoing communications by the telecommunication subscriber equipment.

7. The method of claim 6, further including programming the window of time to be utilized one time period a day for each day.

8. The method of claim 7, further including programming the window of time to be a predefined number of hours for each 24-hour period.

9. The method of claim 6, further including providing a user during use of the telecommunication subscriber equipment with an indication when the window of time is about to expire.

10. The method of claim 9, further including providing an audible signal as said indication.

11. The method of claim 9, further including disconnecting the user during utilization of the subscriber equipment after termination of said window of time.

12. The method of claim 6, further including continuing to compare said window of time with said actual time during utilization of the telecommunication subscriber equipment.

13. The method of claim 6, further including detecting an identification of the telecommunication subscriber equipment and accessing a database to determine the window of time associated with said telecommunication subscriber equipment.

14. The method of claim 13, further including providing a user of the telecommunication subscriber equipment with a lower cost service in exchange for a time limited utilization of the telecommunication subscriber equipment.

15. The method of claim 6, further including the step of determining if a full duplex mode of communication is requested by said subscriber equipment, and if a full duplex mode of communication is requested within said window of time, preventing utilization of the telecommunication subscriber equipment.

16. The usage circuit of claim 6, further including allocating a specified total duration of usage for a specified period of time, and when said duration of usage has expired, disallowing further usage of said subscriber equipment.

17. In a telecommunication equipment, a usage circuit for controlling use of the equipment, comprising in combination:

a timer for keeping time;

a preprogrammed time interval defining a window of usage of the telecommunication equipment;

a comparator for comparing the time of the timer with the window to provide at least two different outputs;

a control circuit for denying use of the telecommunication equipment if the comparator output is of a first type, and allowing use of the telecommunication equipment if the comparator output is of a second type; and a subscriber instrument having a processor programmed to function as said timer and as said comparator.

18. The usage circuit of claim 17, further including said processor being programmed to decode a time field transmitted to the subscriber instrument for defining a time of day parameter.

19. The usage circuit of claim 18, wherein said processor is programmed to start said timer based on said time of day parameter.

20. In a telecommunication equipment, a usage circuit for controlling use of the equipment, comprising in combination:

a timer for keeping time;

a preprogrammed time interval defining a window of usage of the telecommunication equipment;

a comparator for comparing the time of the timer with the window to provide at least two different outputs;

a control circuit for denying use of the telecommunication equipment if the comparator output is of a first type, and allowing use of the telecommunication equipment if the comparator output is of a second type; and a central controller for dispatching telecommunication information to said telecommunication equipment, said central controller having a processor programmed to function as said timer and as said comparator, and wherein said processor is programmed to encode a time parameter into a message transmitted to at least one subscriber instrument.

21. A method of limiting usage of telecommunication equipment based on time, comprising the steps of:

programming the telecommunication equipment to define a window of time in which the telecommunication equipment can be utilized;

receiving an external time parameter defining an actual time by said telecommunication equipment over a telephone communication facility from a central control;

comparing the actual time of attempted use of the telephone equipment with said window of time to determine whether utilization of the telecommunication equipment is allowed at the actual time; and if the comparison of the actual time with the window of time indicates no match therebetween, preventing utilization of the telecommunication equipment.

22. The method of claim 21, further including decoding a frame of information received over said communications facility to define said time parameter.

23. In telecommunication subscriber equipment for making outgoing communications, a usage circuit for controlling use thereof, comprising:

a timer for keeping time, said timer being controlled by receipt of a time parameter transmitted to the telecommunication subscriber equipment;

a preprogrammed time interval defining a window of usage of the telecommunication subscriber equipment;

a comparator for comparing the time of the timer with the window to provide at least two different outputs; and a control circuit for preventing all said outgoing communications of the telecommunication subscriber equipment if the comparator output is of a first type, and allowing use of the telecommunication subscriber equipment if the comparator output is of a second type.

* * * * *